US007909543B2

(12) United States Patent
Hayashizaki et al.

(10) Patent No.: US 7,909,543 B2
(45) Date of Patent: Mar. 22, 2011

(54) INSERT CLAMPING WEDGE AND INSERT-DETACHABLE TYPE CUTTER

(75) Inventors: Hiroaki Hayashizaki, Tsukuba (JP); Hiroshi Hoki, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 168 days.

(21) Appl. No.: 12/411,508

(22) Filed: Mar. 26, 2009

(65) Prior Publication Data

US 2009/0245951 A1 Oct. 1, 2009

(30) Foreign Application Priority Data

Mar. 28, 2008 (JP) ................................ 2008-088334

(51) Int. Cl.
*B23C 5/22* (2006.01)
*B23C 5/20* (2006.01)

(52) U.S. Cl. ........................................................ 407/41

(58) Field of Classification Search .................... 407/40, 407/41, 47, 49, 77, 94, 102, 107, 108
See application file for complete search history.

(56) References Cited

U.S. PATENT DOCUMENTS 3,566,496 A * 3/1971 Kezirian ........................ 407/99
3,624,879 A * 12/1971 Ayer ............................ 407/101
3,660,879 A * 5/1972 Erkfritz .......................... 407/41
4,329,091 A 5/1982 Erkfritz
4,938,638 A 7/1990 Hessman et al.
5,211,516 A * 5/1993 Kress et al. .................. 408/231
6,030,153 A * 2/2000 Votsch et al. .................. 407/36
2007/0256287 A1 11/2007 Kocherovsky et al.

FOREIGN PATENT DOCUMENTS

JP 1-44443 B2 9/1989
JP 1-295709 A 11/1989
WO WO-2008/023361 A1 2/2008

* cited by examiner

*Primary Examiner* — Will Fridie, Jr.
(74) *Attorney, Agent, or Firm* — Leason Ellis LLP.

(57) ABSTRACT

An insert clamping wedge for clamp-fixing a cutting insert, seated in an insert attachment seat formed in a cutter body, to a recessed portion formed in the insert attachment seat is provided, the insert clamping wedge including: a wedge body, wherein the insert clamping wedge is pressed into the cutter body, wherein the wedge body includes a clamp surface which comes into close contact with the cutting insert and a wedge surface of which a gap between itself and the clamp surface becomes smaller in a press-insertion direction of the wedge body, and wherein the section perpendicular to the press-insertion direction of the wedge body from the wedge surface to the clamp surface being formed in a bell shape.

8 Claims, 8 Drawing Sheets

30 13 12A 12 14 16 16A 16B 2 5 21 6 11 10 3 T

INSERT CLAMPING WEDGE AND INSERT-DETACHABLE TYPE CUTTER

BACKGROUND OF THE INVENTION

1. Field of the Invention

The present invention relates to an insert clamping wedge (hereinafter, referred to as a clamp wedge) which is used to detachably clamp-fix a cutting insert to an insert attachment seat of a cutter body in an insert-detachable type cutter such as a face mill and also relates to an insert-detachable type cutter which is mounted with the clamp wedge so as to attach the cutting insert thereto.

Priority is claimed on Japanese Patent Application No. 2008-88334, filed Mar. 28, 2008, the content of which is incorporated herein by reference.

2. Description of Related Art

An insert-detachable type cutter using a clamp wedge is disclosed in, for example, Japanese Examined Patent Application Publication, Second Publication No. H01-44443, Japanese Unexamined Patent Application, First Publication No. H01-295709, and PCT International Publication No. WO 2008/023361. The insert-detachable type cutter includes a cutter body, a cutting insert, and a clamp wedge which is used to fix the cutting insert to the cutter body. The cutter body is provided with an insert attachment seat and a recessed portion which communicates with the insert attachment seat. The cutting insert is seated in the insert attachment seat. The clamp wedge is inserted into the recessed portion. The clamp wedge is pressed by a pressing member such as a clamp screw so as to be inserted into the cutter body along a wedge surface of the clamp wedge. At this time, the cuffing insert having a polygonal flat plate shape seated in the insert attachment seat is pressed into the insert attachment seat in a thickness direction so as to be clamp-fixed thereto by means of a clamp surface of the clamp wedge. Here, the surface of the clamp wedge is inclined so that the distance between the wedge surface and the surface of the clamp wedge becomes smaller in a press-insertion direction.

In order to reliably fix the cutting insert by means of the clamp wedge, it is necessary to ensure a large area of the clamp surface. However, in the clamp wedge disclosed in Japanese Examined Patent Application Publication, Second Publication No. H01-44443, Japanese Unexamined Patent Applications First Publication No. H01-295709, and PCT International Publication No. WO 2008/023361, a section perpendicular to the press-insertion direction is formed such that the clamp surface is formed in a square shape and the wedge surface is formed in a semicircular arc shape which has the same width as that of the square shape and is smoothly connected to the square shape. That is, the clamp wedge is formed in a semicircular arc shape (barrel roof shape or vault shape). Accordingly, when the width of the clamp surface in the section increases in order to increase the area of the clamp surface, the radius of the semicircular arc shape of the wedge surface increases. That is, when the area of the clamp surface increases, the wedge body simply increases in size.

When the wedge body increases in size, the recessed portion of the cutter body mounted with the clamp wedge increases in size. On the other hand, the distance between the recessed portion and the outer peripheral surface of the cutter body becomes smaller. Accordingly, when the clamp wedge is pressed so as to clamp the insert, the clamping strength may deteriorate or the thinned portion may be deformed or damaged.

Recently, in such an insert-detachable type cutter, a so-called increase in the number of blades is required so as to realize the high efficiency of processing by increasing the number of blades provided in the cutter body. Accordingly, the number of the cutting inserts and the clamp wedges for fixing the same tends to increase. However, in the case where the number of cutting blades increases, the gap between the insert attachment seat and the recessed portion is limited. As a result, it is difficult to form the recessed portion having a large area described above.

SUMMARY OF THE INVENTION

The present invention is contrived in consideration of the above-described circumstance. That is, an object of the present invention is to provide a clamp wedge and an insert-detachable type cutter capable of preventing a sectional area of a wedge body and a recessed portion perpendicular to a press-insertion direction of a wedge body from excessively increasing, of maintaining the thickness of a cutter body, and of ensuring a large area of a clamp surface by enlarging the width of the clamp surface.

In order to solve the above-described problems and to achieve the above-described object, a clamp wedge according to the present invention has the following characteristic configuration. The clamp wedge according to the present invention is an insert clamping wedge which clamp-fixes a cutting insert, seated in an insert attachment seat formed in a cutter body, to the insert attachment seat. A wedge body pressed into the cutter body is provided with a clamp surface which comes into close contact with the cutting insert and a wedge surface of which the gap between the wedge surface and the clamp surface becomes smaller in a press-insertion direction of the wedge body. An external shape of the wedge surface in a section perpendicular to the press-insertion direction of the wedge body includes a protruded curve portion and recessed curve portions of which the distance therebetween becomes larger in a direction from both ends of the protruded curve portion toward the clamp surface. That is, the section from the wedge surface to the clamp surface is formed in a bell shape.

In an insert-detachable type cutter according to the present invention, the clamp wedge is mounted to the recessed portion, formed in the cutter body so as to communicate with the insert attachment seat, in such a manner that the wedge surface is pressed by a pressing member so as to come into slidable contact with an inner wall surface of the recessed portion.

In the clamp wedge and the insert-detachable type cutter according to the present invention, the sectional shape perpendicular to the press-insertion direction of the wedge body is formed in a bell shape. That is, in the wedge surface of the wedge body, both ends of the protruded curve form a recessed curve to thereby form a narrowed shape. Accordingly, even when the width of the clamp surface increases to ensure a large area, it is possible to prevent the sectional area of the wedge body and the recessed portion perpendicular to the press-insertion direction from excessively increasing. As a result, it is possible to cope with an increase in the number of cutting blades by using the clamp wedge according to the present invention. Also, in the insert-detachable type cutter according to the present invention, the clamp wedge according to the present invention is used. Accordingly, even when the number of cutting blades increases, it is possible to prevent the cutter body from being deformed or damaged by maintaining the thickness in the periphery of the recessed portion of the cutter body and to strongly fix the cutting insert by improving the clamping strength.

Further, in the section perpendicular to the press-insertion direction, the wedge surface of the wedge body of the clamp wedge is formed by a region from the protruded curve portion to at least the recessed curve portions in both ends thereof. That is, the gap between the wedge surface and the clamp surface becomes smaller in the press-insertion direction of the wedge body. With such a configuration, it is possible to reliably apply the pressing force from both ends of the wedge surface to the opposite-side clamp surface by pressing the wedge body. Accordingly, in the clamp wedge according to the present invention, it is possible to strongly fix the cutting insert in a stabler manner.

Meanwhile, in order to prevent deterioration of the clamping strength described above in the circular cutter body of the insert-detachable type cutter, the cutter body may have the following configuration. That is, in a section perpendicular to the press-insertion direction, each of opening peripheries of the recessed portion of the cutter body are formed in a recessed surface which rises up in a direction opposite to the press-insertion direction as the distance from the clamping wedge in a diameter direction of the cutter body becomes greater. Accordingly, even when the gap between the insert attachment seat and the recessed portion is limited due to the increase in the number of cutting blades, it is possible to ensure a large thickness in both ends of the periphery of the recessed portion of the cutter body in the press-insertion direction. As a result, it is possible to improve the clamping strength by ensuring the rigidity of the periphery of the recessed portion of the cutter body.

In addition, when the recessed portion is located on the side of the rake face of the cutting insert fixed to the insert attachment seat, the opening periphery of the recessed portion, of which rises up to be formed in a recessed surface shape, may be formed in a recessed curve shape. With such a configuration, it is possible to increase the capacity of the chip pocket formed by the opening periphery and the wedge body by ensuring the rigidity of the cutter body as described above. Accordingly, it is possible to smoothly discharge small fragments produced by the cutting blade of the cutting insert and the abrading the rake face.

As described above, according to the present invention, it is possible to maintain the small thickness of the cutter body by preventing the sectional area of the wedge body or the recessed portion from increasing even in the insert-detachable type cutter having a plural of blades. Accordingly, according to the present invention, it is possible to prevent a deformation or damage of the cutter body and to improve the clamping strength. In addition, since it is possible to obtain the clamp surface having a large area by enlarging the width of a clamp surface of the clamp wedge, the cutting insert can be strongly fixed. As a result, it is possible to efficiently and highly precisely carry out a cutting process in a stable manner.

DETAILED DESCRIPTION OF THE INVENTION

Figure 1:
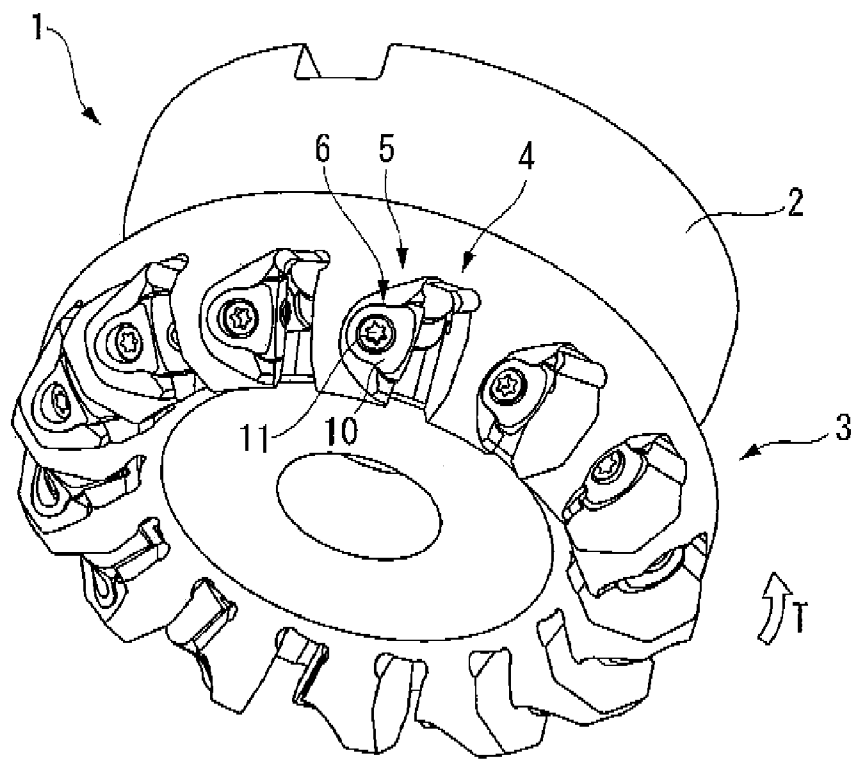
FIG. 1 is a perspective view showing an insert-detachable type cutter according to an embodiment of the present invention when viewed from the front-end outer peripheral side of a cutter body 1.
Figure 2:
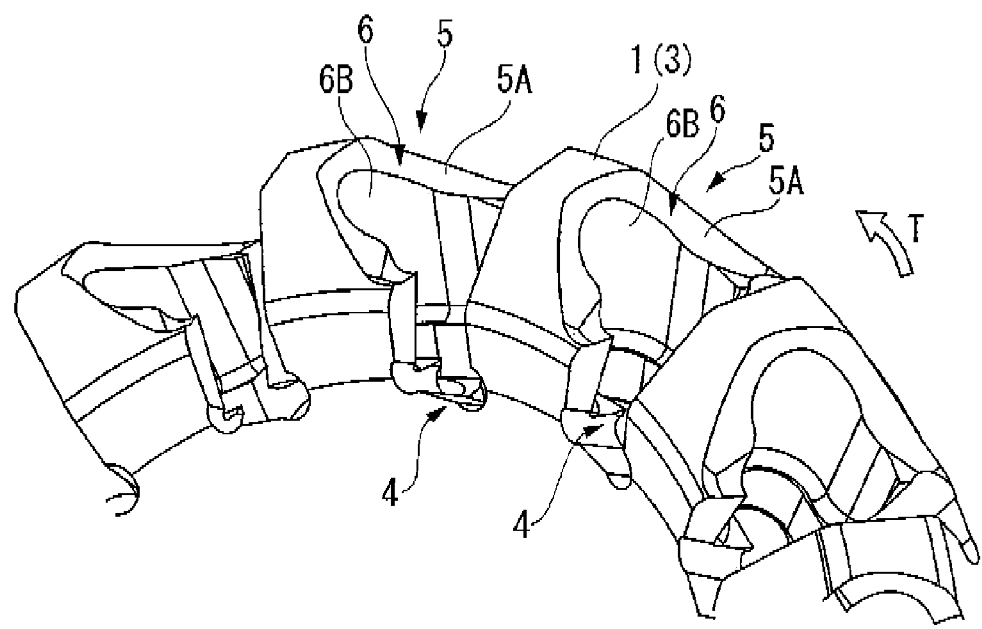
FIG. 2 is an enlarged perspective view showing a front-end outer peripheral portion of the cutter body 1 according to the embodiment shown in FIG. 1 when viewed from the front end side thereof.
Figure 3:
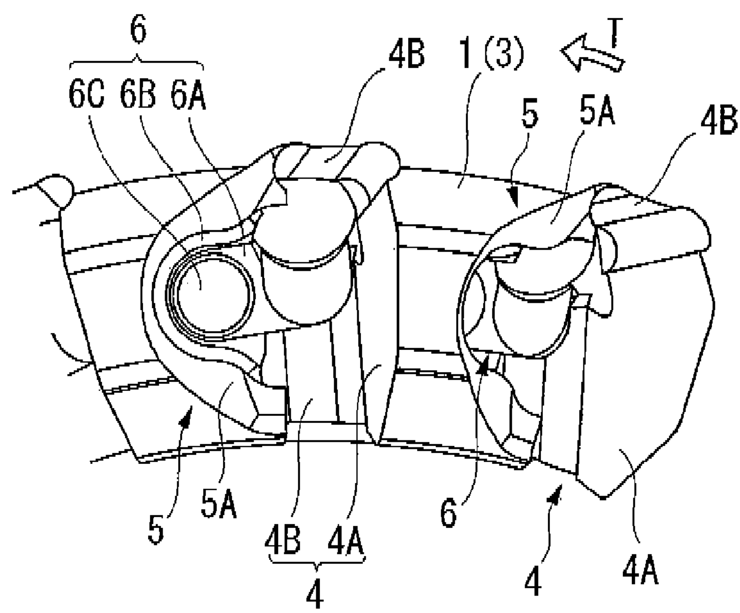
FIG. 3 is an enlarged view showing the periphery of an insert attachment seat 4, a chip pocket 5, and a recessed portion 6 according to the embodiment shown in FIG. 1 when viewed along the central axis of a screw hole 6C.

FIGS. 1 to 14 are views showing a clamp wedge and an insert-detachable type cutter according to an embodiment of the present invention. In the insert-detachable type cutter according to this embodiment, a cutter body 1 is formed of steel or the like so as to have a substantially disc shape as shown in FIG. 1. The rear end side (the upper side of FIG. 1)

of the cutter body 1 in a central axial direction is formed as an attachment portion 2 which is attached to a main shaft of a machine tool. The front end side (the lower side of FIG. 1) of the cutter body 1 is formed as a blade portion 3 having a diameter larger than that of the attachment portion 2 by one level. The cutter body 1 is configured to rotate about the central axis in a cutter rotation direction T so as to be used in which a workpiece is cut.

The front-end outer peripheral side of the blade portion 3 is provided with an insert attachment seat 4 which is formed by cutting the rear-end inner peripheral side of the blade portion 3 so as to fix a cutting insert 21 thereto in a seated state as described below. Also, the front-end outer peripheral side thereof is provided with a chip pocket 5 and a recessed portion 6 which communicate with each other in the insert attachment seat 4 in the cutter rotation direction T. Plural groups each including the insert attachment seat 4, the chip pocket 5, and the recessed portion 6 are arranged in a circumferential direction of the blade portion 3 so as to have a predetermined interval therebetween. A clamp wedge 10 according to this embodiment is inserted into the recessed portion 6 so as to be pressed toward the rear-end inner peripheral side of the cutter body 1 by means of a clamp screw 11 (pressing member 11) of which both ends are provided with a male screw portion. Accordingly, the cutting insert 21 is pressed into the insert attachment seat 4 so as to be clamp-fixed thereto.

Figure 11:
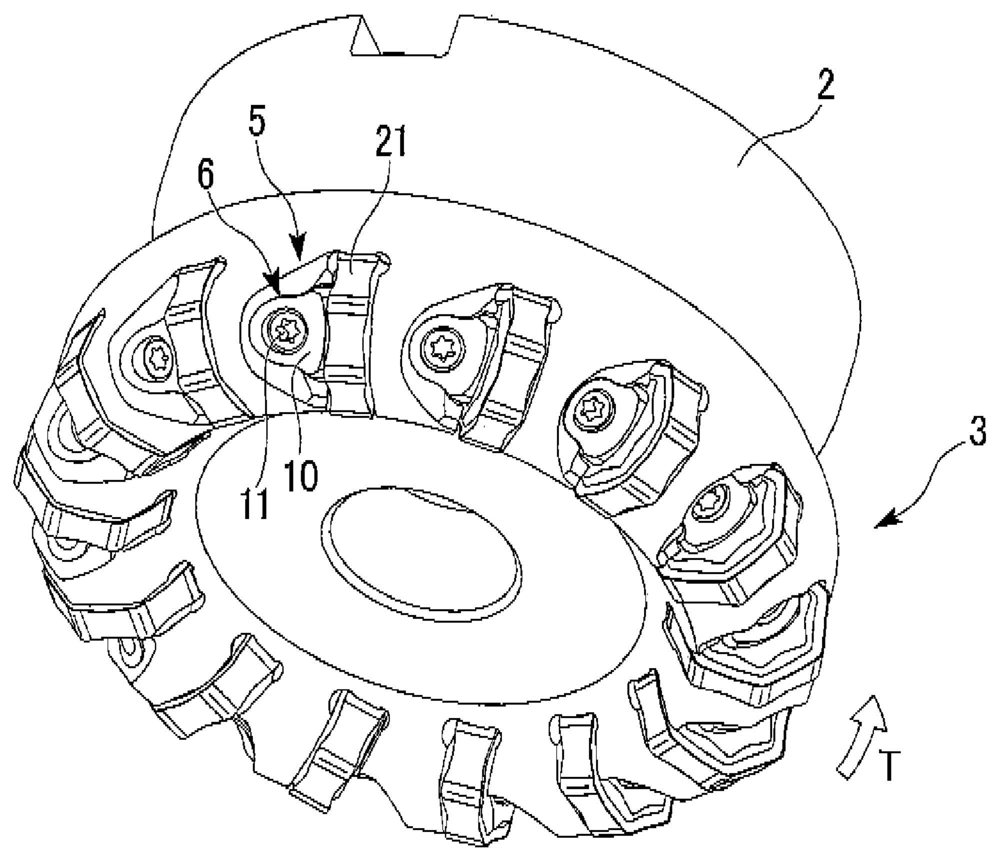
FIG. 11 is a perspective view showing the insert-detachable type cutter according to the embodiment of the present invention attached with the cutting insert when viewed from the front-end outer peripheral side of the cutter body 1.
Figure 12:
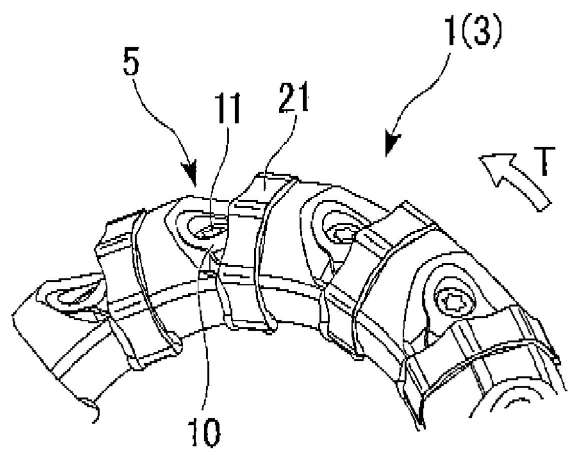
FIG. 12 is an enlarged perspective view showing the front-end outer peripheral portion of the cutter body 1 according to the embodiment shown in FIG. 11 when viewed from the front end side thereof.
Figure 13:
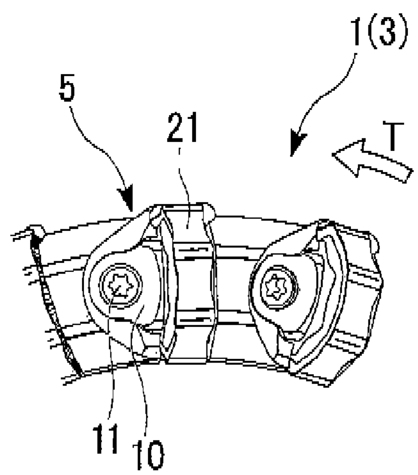
FIG. 13 is an enlarged view shown the periphery of a chip pocket 5, a clamp wedge 10, a clamp screw 11, and a cutting insert 21 according to the embodiment shown in FIG. 11 when viewed along the central axis of the clamp screw 11.
Figure 14:
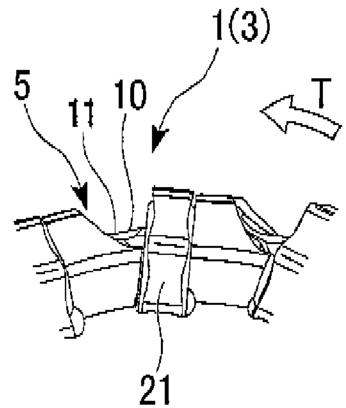
FIG. 14 is an enlarged view showing the periphery of the chip pocket 5, the clamp wedge 10, the clamp screw 11, and the cutting insert 21 according to the embodiment shown in FIG. 11 when viewed in a direction perpendicular to the central axis of the clamp screw 11.

FIGS. 11 and 14 show the insert-detachable type cutter in which each cutting insert 21 is accommodated in each insert attachment seat 4 and is pressed by each clamp wedge 10 so as to be clamped thereto.

Figure 15:
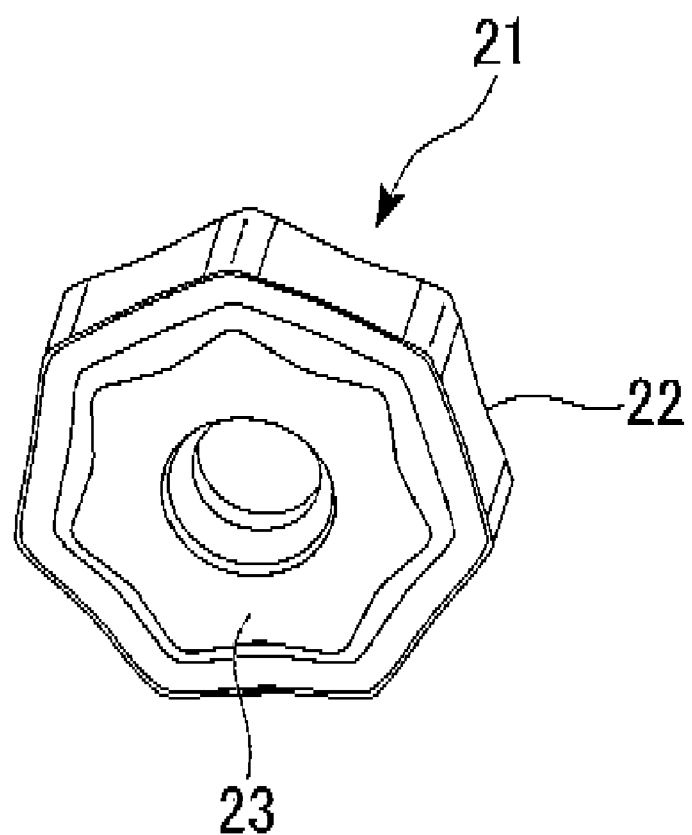
FIG. 15 is a perspective view showing the cutting insert attached to the cutter body 1 according to the embodiment shown in FIG. 11.

The cutting insert attached to the insert-detachable type cutter according to this embodiment is formed of a hard material such as hard metal so as to have a regular polygonal (for example, a regular heptagonal) flat plate shape. An example of the cutting insert is shown in FIG. 15. The cutting insert 21 having a flat plate shape shown in this example has a configuration in which both side surfaces are formed parallel to each other in a substantially regular heptagonal shape, one side surface is formed as a rake face 23, and then the other side surface is formed as a seat surface 22 facing the insert attachment seat 4. A cutting blade is formed in a side ridge of the rake face. The cutting insert 21 is formed as a hollow insert in which a circular hole is formed in the center of the rake face in a sectional view, and the rake face is formed as a surface having a hole formed therethrough.

The insert attachment seat 4, on which the hollow cutting insert 21 is seated, includes a flat bottom surface 4A facing the cutter rotation direction T and a pair of wall surfaces 4B uprightly formed from the side ridges on the inner peripheral side and the rear end side of the cutter body 1 of the bottom surface 4A. Two side surfaces of the hollow insert 21 respectively come into contact with the wall surfaces 4B so as to allow the rake face 23 to face the cutter rotation direction T. At the same time, the seat surface 22 of the hollow insert comes into close contact with the bottom surface 4A, and the hollow insert is seated in the insert attachment seat 4. At this time, for example, in the case where the insert-detachable type cutter is a face mill, one of seven cutting blades of the cutting insert 21 is located on one plane perpendicular to the central axis of the face mill.

Figure 4:
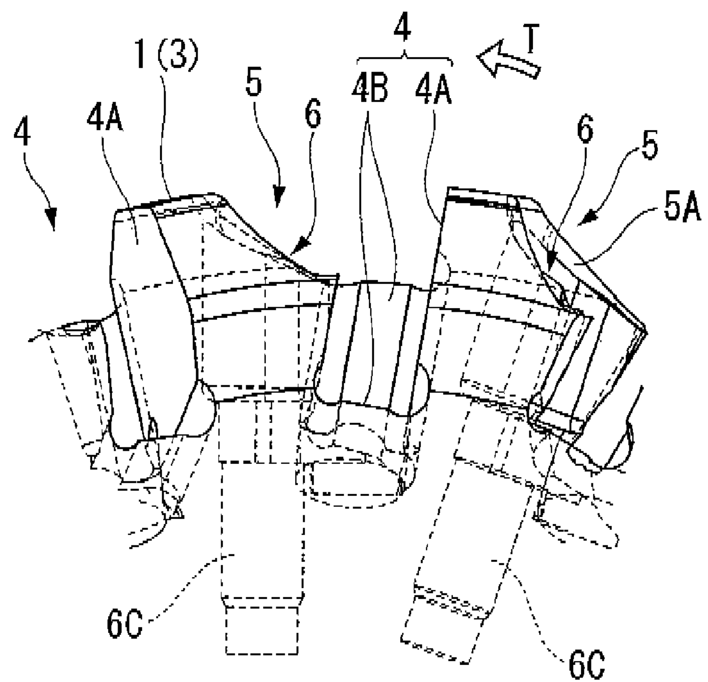
FIG. 4 is an enlarged new showing the periphery of the insert attachment seat 4, the chip pocket 5, and the recessed portion 6 according to the embodiment shown in FIG. 1 when viewed in a direction parallel to a bottom surface 4A of the insert attachment seat 4 and perpendicular to the central axis of the screw hole 6C.
Figure 5:
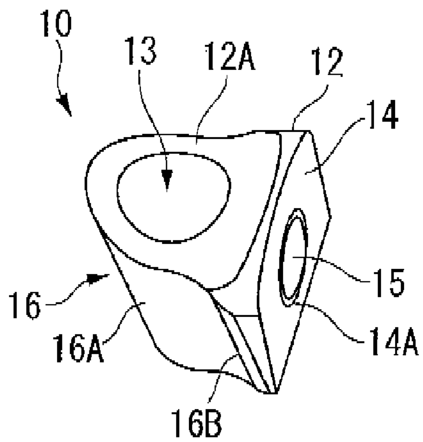
FIG. 5 is a perspective view showing a clamp wedge 10 according to the embodiment of the present invention.
Figure 6A:
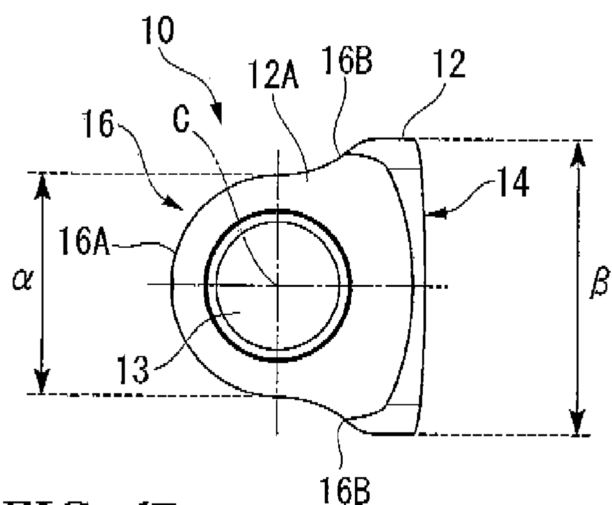
FIG. 6A is a view showing the clamp wedge 10 according to the embodiment shown in FIG. 5 when viewed along the central axis C of a screw hole 13 in an end surface 12A.
Figure 6B:
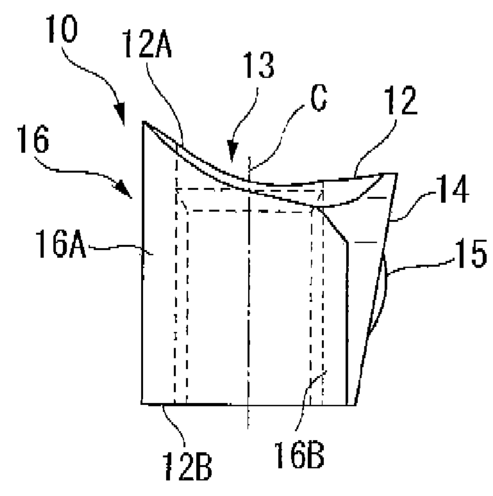
FIG. 6B is a view showing the clamp wedge 10 according to the embodiment shown in FIG. 5 when viewed in a direction parallel to a clamp surface 14 and perpendicular to the central axis C.
Figure 6C:
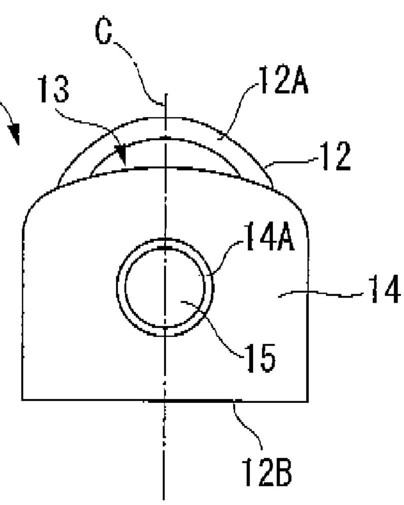
FIG. 6C is a view showing the clamp wedge 10 according to the embodiment shown in FIG. 5 when viewed in a direction perpendicular to the central axis C and facing the clamp surface 14.
Figure 7:
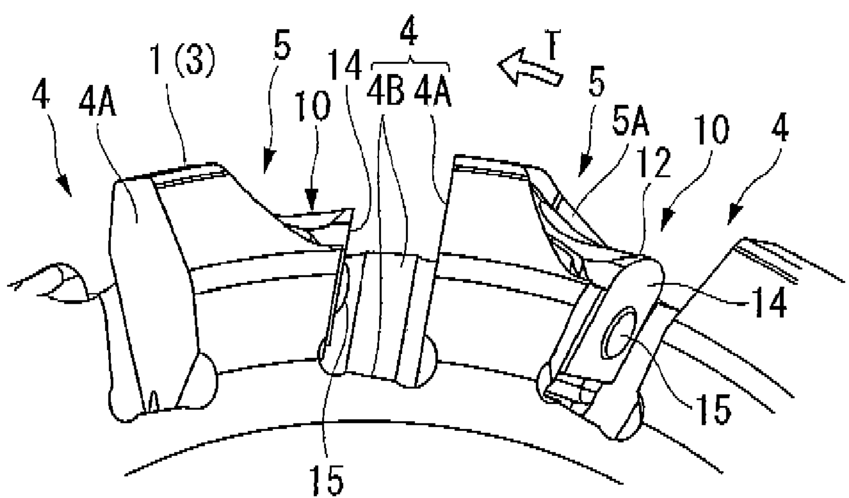
FIG. 7 is a view showing the clamp wedge 10 according to the embodiment is inserted into the recessed portion 6 shown in FIG. 4.
Figure 8:
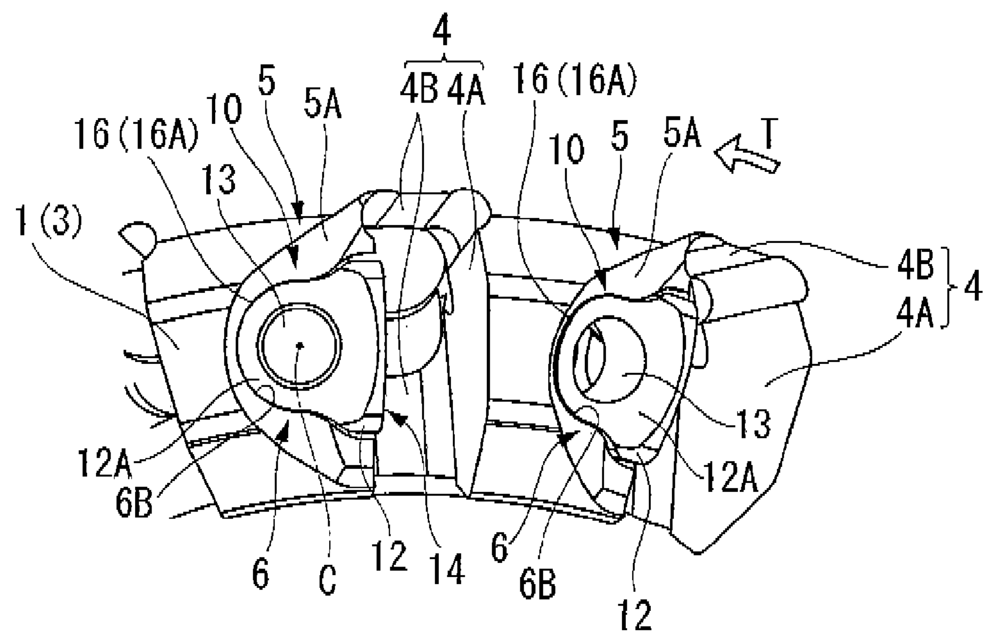
FIG. 8 is a view shown the clamp wedge 10 according to the embodiment is inserted into the recessed portion 6 shown in FIG. 3.

As shown in FIG. 4, the chip pocket 5 is formed to be widened toward the outer peripheral side of the cutter body 1 (the upper side of FIG. 4) in the cutter rotation direction T. The recessed portion 6 is opened at the center portion of the bottom surface 5A of the chip pocket 5 facing the outer peripheral side of the cutter body 1 so as to have a gap with respect to the peripheral surface of the cutter body 1. Also, the recessed portion 6 extends to the rear-end inner peripheral side of the cutter body 1 so as to communicate with the insert attachment seat 4.

The recessed portion 6 includes a bottom surface 6A which is located on the rear-end inner peripheral side of the cutter body 1 and an inner wall surface 6B which extends from the bottom surface 5A of the chip pocket 5 toward the bottom surface 6A and the rear-end inner peripheral side of the cutter body 1. The bottom surface 6A is provided with a screw hole 6C into which the male screw portion of one end of the clamp screw 11 is threaded. The screw hole 6C faces the rear-end inner peripheral side of the cutter body 1 and the bottom surface 4A of the insert attachment seat 4 so as to extend in a direction in which the pair of wall surfaces 4B intersects each other. The inner wall surface 6B extends in parallel to the central axis of the screw hole 6C. The direction facing the inside (rear-end inner peripheral side) of the cutter body 1 along the central axis of the screw hole 6C corresponds to the direction in which the clamp wedge 10 according to this embodiment is pressed. The recessed portion 6 is formed in a complementary shape with respect to the shape of the clamp wedge 10.

In the clamp wedge 10 inserted and pressed into the recessed portion 6, a wedge body 12 is formed of steel or the like. As shown in FIGS. 5 and 6A to 6C, the clamp wedge 10 is formed in a hollow piece shape. The hollow portion is formed as a screw hole 13 into which the male screw portion of the other end of the clamp screw 11 is threaded. The wedge body 12 is inserted into the recessed portion 6 in such a manner that one end surface 12A faces the front-end outer peripheral side (front side) of the cutter body 1 and the other end surface 12B faces the bottom surface 6A of the recessed portion 6. Then, the clamp wedge 10 is pressed into the recessed portion 6 in a direction toward the rear-end inner peripheral side of the cutter body 1 by respectively threading the mate screw portions of both ends of the clamp screw 11 into the screw hole 13 of the clamp wedge 10 and the screw hole 6C. Accordingly, in the clamp wedge 10, the direction from the end surface 12A to the end surface 12B along the central axis C of the screw hole 13 corresponds to the press-insertion direction.

One of side surfaces extending between both end surfaces 12A and 12B of the wedge body 12 is formed as a clamp surface 14 which comes into close contact with the rake face of the hollow insert in a direction toward the insert attachment seat 4 when the clamp wedge 10 is pressed into the recessed portion 6. In this embodiment, a protrusion 15 is formed at the center of the clamp surface 14. At the boundary between the protrusion 15 and the clamp surface 14, a recessed groove portion 14A is formed so as to be slightly recessed from the clamp surface 14. In this embodiment, the whole surface of the clamp surface 14 except for the protrusion 15 and the recessed groove portion 14A is formed in an inclined plane shape in which the inclined plane becomes closer to the central axis C of the screw hole 13 in a direction toward the end surface 12A at an inclined angle formed between the central axis of the screw hole 6C and the bottom surface 4A of the insert attachment seat 4. The inclined plane shape is formed so as to surround the protrusion 15 and the recessed groove portion 14A.

In addition, in this embodiment, the surface of the protrusion 15 is formed in a spherical shape. The section taken along the clamp surface 14 and the section parallel to the clamp surface 14 are formed in a circular shape. Here, as shown in FIG. 6, the protrusion height of the protrusion 15 from the clamp surface 14 is set to be sufficiently smaller than the radius of the circle formed by the protrusion 15 in the section taken along the clamp surface 14. At the same time, the radius of the circle in the section is set to be smaller than the radius of the circle formed by the opening of the rake face of the hollow insert. That is, the protrusion 15 is configured to be accommodated in the hole of the rake face of the hollow insert when the clamp wedge 10 is pressed into the recessed portion 6 so that the clamp surface 14 comes into close contact with the perforated surface of the hollow insert.

On the other hand, the side surface of the wedge body 12 facing the opposite side of the clamp surface 14 is formed as a wedge surface 16. The wedge surface 16 is formed as a surface (a contact surface in a movable state) which comes into slidable contact with the inner wall surface 6B when the clamp wedge 10 is pressed into the recessed portion 6 of the cutter body 1. The wedge surface 16 extends in a direction parallel to the central axis C between both end surfaces 12A and 12B so that the section perpendicular to the central axis C, that is, the section perpendicular to the press-insertion direction is uniform. A side surface is formed between the wedge surface 16 and the clamp surface 14 so as to be perpendicular to the clamp surface 14 and to be parallel to the central axis C, and the clamp surface 14 is inclined with respect to the central axis C. Accordingly, the width of the side surface becomes narrow in a direction toward the end surface 12B.

In addition, a protruded curve portion 16A and recessed curve portions 16B are formed in a section of the wedge surface 16 which is perpendicular to the press-insertion direction. The protruded curve portion 16A is a protruded curve portion (barrel roof shape parts or vault shape parts) which forms a protruded curve having a semicircular arc shape (a half of a circular arc) with respect to the central axis C. Each recessed curve portion 16B is a recessed curve portion which faces the clamp surface 14 and is formed in a recessed curve such as a recessed circular arc which smoothly connects both ends of the protruded curve portion 16A to the protruded curve portion 16A. The recessed curve portions 16B widen toward the clamp surface 14 in a direction in which the clamp surface 14 extends in the section (a vertical direction of FIG. 6A and a horizontal direction of FIG. 6C) and is connected to the side surface. Accordingly, in this embodiment, the shape perpendicular to the press-insertion direction of the wedge body 12 is a bell shape shown in FIG. 6A.

In the clamp wedge 10 according to the present invention, a ratio between the width of the clamp surface (β of FIG. 6A) and the diameter (α of FIG. 6A) of the semicircular arc about the central axis C of the protruded cure portion 16A is not limited, but is desirably equal to or more than 60% and less than 100%, and more desirably equal to or more than 70% and equal to or less than 80%.

The sectional shape of the inner wall surface 6B of the recessed portion 6 of the cutter body has a recessed-protruded shape opposite to a recessed-protruded shape of the wedge surface 16, the inner wall surface 6B being configured to come into contact with the wedge surface 16 when the clamp wedge 10 is pressed into the recessed portion 6. That is, the sectional shape of the inner wall surface 6B includes a recessed curve portion which forms a recessed curve having a semicircular arc shape (a half of a circular arc) about the central axis of the screw hole 6C and a protruded curve portion which forms a protruded curve such as a protruded circular arc smoothly connecting both ends of the recessed curve portion to the recessed curve portion so as to be widened in a direction toward the insert attachment seat 6.

The bottom surface 5A of the chip pocket 5 of the cutter body 1 is formed in a shape (a recessed surface shape or a bowl shape) which rises up in a direction opposite to the press-insertion direction, the bottom surface 5A corresponding to the periphery of the opening where the recessed portion 6 is opened. That is, in the section perpendicular to the press-insertion direction, that is, the section perpendicular to the central axis of the screw hole 6C, the bottom surface 5A is formed in a recessed surface shape which rises up in a direction (the front side of FIGS. 3 and 8) opposite to the press-insertion direction as the distance from the clamping wedge 10 in a diameter direction of the cutter body becomes greater, that is, the bottom surface 5A toward both ends in an extension direction of the clamp surface 14 of the clamp wedge 10 pressed into the recessed portion 6, or direction toward both sides of the bottom surface 4A of the insert attachment seat 4 extending in the same section (a vertical direction of FIGS. 3 and 8).

In this embodiment, the recessed surface formed by the bottom surface 5A is formed in a recessed curve surface shape. That is, the bottom surface 5A on the side of the recessed portion 6 is formed in a recessed curve shape in the section including the central axis of the screw hole 6C and perpendicular to the bottom surface 4A of the insert attachment seat 4. At the same time, the bottom surface 5A is formed in a recessed curve surface shape which rises up to the front-end outer peripheral side of the cutter body 1 so as to be connected to the peripheral surface of the cutter body 1 as the bottom surface 5A becomes closer to the rear-end outer peripheral side and the front-end inner peripheral side of the cutter body 1 in a direction perpendicular to the plane forming the section (see FIG. 4).

The hollow insert is attached to the insert-detachable type cutter having the above-described configuration. First, the wedge surface 16 comes into slidable contact with the inner wall surface 6B so as to insert the clamp wedge 10 into the recessed portion 6. Subsequently, the clamp screw 11 is threaded into the screw hole 13 of the wedge body 12 and the screw hole 6C of the recessed portion 6 so as to temporarily fix the clamp wedge 10 to the cutter body 1. Subsequently, the hollow insert is seated in the insert attachment seat 4 as described above. Subsequently, the clamp screw 11 is threaded again so as to press the clamp wedge 10 into the recessed portion 6. At this time, the protrusion 15 of the clamp wedge 10 is accommodated in the hole of the hollow insert, and the clamp surface 14 comes into close contact with the perforated surface so as to press the hollow insert into the bottom surface 4A of the insert attachment seat 4. Accordingly, the hollow insert is fixed in a clamped state. In addition, at this time, the protrusion 15 may come into contact with the opening peripheral edge of the hole so as to draw the hollow insert in a direction in which the pair of wall surfaces 4B intersects each other.

The clamp wedge 10 which clamps the hollow insert is formed in a bell shape. That is, the section perpendicular to the press-insertion direction of the wedge body 12 is formed in a bell shape including the protruded curve portion 16A in which the wedge surface 16 on the opposite side of the clamp surface 14 forms a protruded curve having a semicircular arc shape and the pair of recessed curve portions 16B which forms a recessed curve shape from both ends thereof so that the width therebetween becomes large. With such a configuration, it is possible to ensure a large area of the clamp surface 14 without excessively increasing a sectional area of the wedge body 12 and the recessed portion 6 of the cutter body 1, the sectional area being perpendicular to the press-insertion direction.

In the case where such a clamp wedge is used, it is possible to clamp the cutting insert in the larger area. At the same time, it is possible to improve the attaching rigidity of the clamp wedge 10 by enlarging the distance between the surface of the cutter body 1 and the inner wall surface 6B of the recessed portion 6. Accordingly, it is possible to improve the clamping strength of the hollow insert and thus to highly precisely carry out the cutting process in a stable manner. In addition, since the sectional area of the recessed portion 6 does not excessively increase, it is possible to cope with an increase in the number of blades of the cutter body 1. Accordingly, since deformation or damage does not occur in the cutter body 1 during a clamping operation even when the number of blades increases, it is possible to reliably carry out the efficient cutting process by means of plural blades.

Particularly, in this embodiment, the region from the protruded curve portion 16A to the recessed curve portions 16B of both ends thereof is formed as the wedge surface 16 as described above. In addition, each recessed curve portion 16B is inclined in a direction from the end surface 12A of the wedge body 12 to the end surface 12B, that is, the press-insertion direction so that a gap between itself and the clamp surface 14 becomes small. Accordingly, it is possible to reliably apply the pressing force to both widened side portions of the clamp surface 14 on the under side of the recessed curve portion 16B. Accordingly, it is possible to further strongly clamp-fix the cutting insert, and thus to highly precisely carry out the cutting process in a stabler manner.

Meanwhile, in the insert-detachable type cutter according to this embodiment, the bottom surface 5A of the chip pocket 5 is formed in a recessed surface shape, the bottom surface 5A corresponding to the periphery of the opening where the recessed portion 6 of the cutter body 1 is opened. That is, in a section perpendicular to the press-insertion direction, the bottom surface 5A is formed in a recessed surface shape which rises up in a direction opposite to the press-insertion direction as the distance from the clamping wedge 10 in a diameter direction of the cutter body becomes greater. For this reason, even when the gap between groups each having the insert attachment seat 4, the chip pocket 5, and the recessed portion 6 is limited to be small due to an increase in the number of blades, it is possible to ensure a large thickness of the cutter body 1 in the periphery of the recessed portion 6. Accordingly, it is possible to improve the rigidity in the periphery of the recessed portion 6. As a result, it is possible to strongly carry out the insert attaching operation in a stable manner by reliably ensuring the clamping strength.

In the recessed surface formed by the bottom surface 5A of the chip pocket 5, for example, a section perpendicular to the plane including the central axis of the screw hole 6C and perpendicular to the bottom surface 4A of the insert attachment seat 4 may be formed in a V-shape. In this embodiment, in the same section, the bottom surface 5A on the side of the recessed portion 6 forms the most recessed curve so as to rises up in a direction opposite to the press-insertion direction as the distance from the clamping wedge (10, 20, 30) in a diameter direction of the cutter body becomes greater, that is, toward the rear-end outer peripheral side and the front-end inner peripheral side of the cutter body 1. With such a configuration, it is possible to increase the capacity of the chip pocket 5 compared with the case where the section is formed in a V-shape as described above. Accordingly, in the insert-detachable type cutter according to this embodiment, it is possible to reliably accommodate small fragments produced by the cutting blade of the cutting insert in the chip pocket 5 and to smoothly discharge the small fragments. That is, in the insert-detachable type cutter according to this embodiment, it is possible to efficiently carry out the cutting process in a more stable manner.

Further, in the clamp wedge 10 according to this embodiment, the clamp surface 14 is provided with the protrusion 15 which is accommodated in the hole of the hollow insert. Upon performing a corner change operation of the insert due to the abrasion of the cutting blade after the clamped hollow insert is used for a cutting process, first, the clamp screw 11 is slightly loosened so as to release the pressed state of the hollow insert. Subsequently, in the range that the protrusion 15 is accommodated in the hole of the hollow insert 21 so as to maintain the engagement therebetween, the clamp wedge 10 and the hollow insert are drawn out to the rear side in the press-insertion direction so as to deviate from each other. At this time, the hollow insert engages with the protrusion 5 so as to be rotatable about the protrusion 15 while being prevented from separating from the insert attachment seat 4.

Subsequently, in this state, the hollow insert is rotated so that the cutting blade to be used faces a predetermined direction. Subsequently, the insert is seated again in the insert attachment seat 4, and is clamped by threading the clamp screw 11 thereinto. Accordingly, for example, even when the insert-detachable type cutter is a face mill or the like and is mounted to a main shaft of a machine tool so that the insert attachment seat 4 faces downward, it is possible to carry out the corner change operation without dropping the hollow insert. For this reason, in the lamp wedge 10 and the insert-detachable type cutter according to this embodiment, an operator does not have to rotate the inserts individually while pressing the insert by hand so as not to be dropped or an operator does not have to separate the cutter body 1 from the main shaft so as to carry out the corner change operation. Accordingly, even when the cutter has a plural of blades, inserts, and clamp wedges 10, it is possible to easily carry out the corner change operation in a short amount of time and to promptly resume the cutting process. As a result, it is possible to improve the working efficiency or the economical efficiency by shortening the overall processing time.

In addition, in this embodiment, since the protrusion 15 is formed in a spherical shape, the protrusion 15 is not crushed even when the corner change operation is repeated. At the same time, in this embodiment, it is possible to ensure a large gap between the hole and the protrusion in such a manner that the clamp wedge 10 is made to recede along the inner wall surface 6B of the recessed portion 6 as described above so as to have a slight gap between the clamp surface 14 and the perforated surface of the hollow insert. Accordingly, since the insert is easily rotated, it is further possible to simply carry out the corner change operation.

The protrusion 15 may be formed in a shape in which the corner change operation can be carried out by allowing the hollow insert to be rotatable about the protrusion 15 when the clamp wedge 10 and the hollow insert are drawn out to the rear side in the press-insertion direction in a range that the engagement between the protrusion 15 and the hole is maintained. For example, the protrusion 15 may be formed in a conical shape or a conical trapezoid shape. In addition, the hollow insert may not be formed in a regular polygonal flat plate shape so long as the side ridge of the surface having a hole formed therethrough is provided with plural cutting blades of which the corners can be changed. For example, the hollow insert may be as a disc-shaped hollow insert. In addition, the hole of the hollow insert may be a perforation hole which is formed through the surface having the hole and the opposite surface thereof. Alternatively, the hole may not be a perforation hole.

Incidentally, in the clamp wedge 10 according to this embodiment, the periphery of the protrusion 15 is surrounded by the clamp surface 14 via the recessed groove portion 14A. For example, like a clamp wedge 20 according to a modified example shown in FIG. 9, the recessed groove portion 14A may extend to the edge of the clamp surface 14 so as to be opened from the edge. In addition, in the modified example shown in FIG. 9 or another modified example shown FIG. 10 described below, the same reference numerals are given to the same parts as those of the clamp wedge 10 according to the above-described embodiment, and the description thereof will be omitted.

Figure 9A:
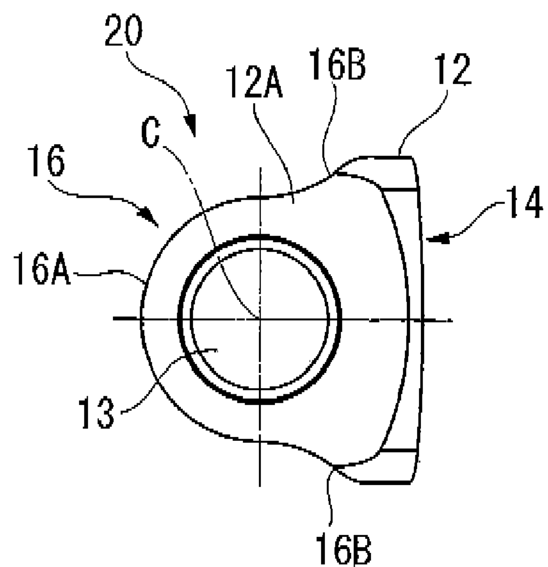
FIG. 9A is a view showing a clamp wedge 20 according to a modified example of the embodiment show in FIG. 5 when viewed along the central axis C of the screw hole 13 in a section 12A.
Figure 9B:
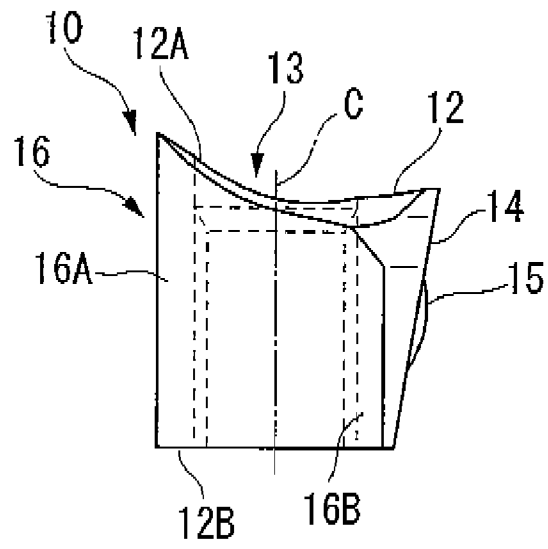
FIG. 9B is a view showing the clamp wedge 20 according to the modified example of the embodiment shown in FIG. 5 when viewed in a direction parallel to the clamp surface 14 and perpendicular to the central axis C.
Figure 9C:
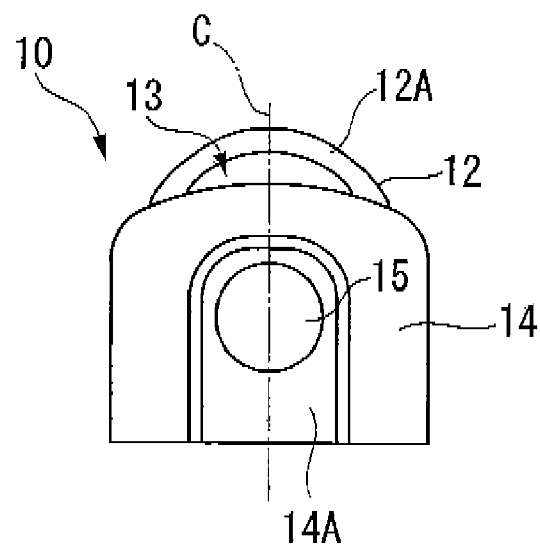
FIG. 9C is a view showing the clamp wedge 20 according to the modified example of the embodiment shown in FIG. 5 when viewed in a direction perpendicular to the central axis C and facing the clamp surface 14.
Figure 10:
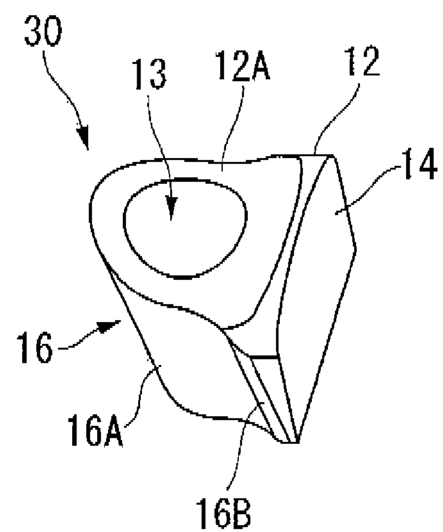
FIG. 10 is a perspective view showing a clamp wedge 30 according to another modified example of the embodiment shown in FIG. 5.

In the case where the recessed groove portion 14A is formed like a modified example shown in FIG. 9, the clamp surface 14 is formed in a U-shape as shown in FIG. 9C. Accordingly, it is possible to carry out a finishing process in such a manner that a finishing tool such as a grinding tool or a finishing end mill used upon smoothly finishing the clamp surface 14 moves once along the U-shape without a locus overlap. That is, in a portion where the finishing tool advances to the clamp surface 14 and a portion where the fishing tool recedes from the clamp surface 14, the finishing surfaces thereof do not overlap with each other. Accordingly, it is possible to reliably allow the clamp surface 14 to come into close contact with the perforated surface of the hollow insert without a minute step formed between the finishing surfaces in the overlapping portions.

However, in the clamp wedge and the insert-detachable type cutter according to the invention, the protrusion 15 or the recessed groove portion 14A may not be formed in the clamp surface 14. That is, like the clamp wedge 30 according to another modified example shown in FIG. 10, the whole clamp surface 14 may be formed in a plane shape in which a gap between the clamp surface 14 and the wedge surface 16 becomes small in the press-insertion direction. According to the clamp wedge 30, it is possible to carry out the clamping operation in a stable manner by further enlarging the contact area between the clamp surface 14 and the cutting insert, and to clamp the cutting insert without a hole instead of the hollow insert.

In the clamp wedge 10 of the above embodiments, the protruded curve portion 16A of the wedge surface 16 has a semicircular shape in a cross section perpendicular to the central axis C. The protruded curve portion 16A may be formed a arc shape having a central angle less than 180° with respect to the central axis C, for example, the central angle may be 45° or the like. In addition, the protruded curve need not be formed the arc shape, the protruded curve may have an elliptical-shaped cross section.

While preferred embodiment of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. An insert clamping wedge for clamp-fixing a cutting insert, seated in an insert attachment seat formed in a cutter body, to a recessed portion formed in the insert attachment seat, the insert clamping wedge comprising:

a wedge body, wherein the insert clamping wedge is pressed into the cutter body, wherein the wedge body includes a clamp surface which comes into close contact with the cutting insert and a wedge surface of which a gap between itself and the clamp surface becomes smaller in a press-insertion direction of the wedge body, and wherein an external shape of the wedge surface in a section perpendicular to the press-insertion direction of the wedge body includes a protruded curve portion and a distance between recessed curve portions of which a width becomes larger in a direction from both ends of the protruded curve portion toward the clamp surface, the section from the wedge surface to the clamp surface being formed in a bell shape.

2. The insert clamping wedge according to claim 1, wherein in the section perpendicular to the press-insertion direction of the wedge body, the wedge surface is formed by a region from the protruded curve portion to at least the recessed curve portions in both ends thereof.

3. An insert-detachable type cutter comprising:

a circular cutter body provided with recessed insert attachment seats which are formed in a circumferential direction at a predetermined interval so as to respectively seat cutting inserts therein and a recessed portion which is formed adjacent to each insert attachment seat;

an insert clamping wedge which is accommodated in each recessed portion and is pressed into a bottom of the recessed portion so as to press-fix the cutting insert to the insert attachment seat; and a pressing member which presses the insert clamping wedge into the bottom of the recessed portion, wherein the insert clamping wedge is the insert clamping wedge according to claim 1, and wherein the recessed portion is formed in a complementary shape with respect to the shape of the insert clamping wedge.

4. The insert-detachable type cutter according to claim 3, wherein in a section perpendicular to the press-insertion direction, each of opening peripheries of the recessed portion of the cutter body are formed in a recessed surface which rises up in a direction opposite to the press-insertion direction as the distance from the clamping wedge in a diameter direction of the cutter body becomes greater.

5. The insert-detachable type cutter according to claim 4, wherein the opening periphery of the recessed portion is formed in a recessed curve surface shape.

6. An insert-detachable type cutter comprising:

a circular cutter body provided with recessed insert attachment seats which are formed in a circumferential direction at a predetermined interval so as to respectively seat cutting inserts therein and a recessed portion which is formed adjacent to each insert attachment seat;

an insert clamping wedge which is accommodated in each recessed portion and is pressed into a bottom of the recessed portion so as to press-fix the cutting insert to the insert attachment seat; and a pressing member which presses the insert clamping wedge into the bottom of the recessed portion, wherein the insert clamping wedge is the insert clamping wedge according to claim 2, and wherein the recessed portion is formed in a complementary shape with respect to the shape of the insert clamping wedge.

7. The insert-detachable type cutter according to claim 6, wherein in a section perpendicular to the press-insertion direction, each of opening peripheries of the recessed portion of the cutter body are formed in a recessed surface which rises up in a direction opposite to the press-insertion direction as the distance from the clamping wedge in a diameter direction of the cutter body becomes greater.

8. The insert-detachable type cutter according to claim 7, wherein the opening periphery of the recessed portion is formed in a recessed curve surface shape.

* * * * *